United States Patent [19]

Chen

[11] Patent Number: 5,604,515
[45] Date of Patent: Feb. 18, 1997

[54] PULSE-TYPE DRIVING DEVICE

[75] Inventor: Chih-Cheng Chen, San Chung, Taiwan

[73] Assignee: Kye Systems Corp., Taipei Hsien, Taiwan

[21] Appl. No.: 340,591

[22] Filed: Nov. 16, 1994

[51] Int. Cl.⁶ .................................... G09G 5/08
[52] U.S. Cl. .................... 345/163; 345/164; 345/166
[58] Field of Search .................... 345/163, 164, 345/166, 167, 211; 178/18

[56] References Cited

U.S. PATENT DOCUMENTS

| | | | |
|---|---|---|---|
| 4,886,941 | 12/1989 | Davis | 345/163 |
| 4,959,805 | 9/1990 | Onouchi et al. | 178/18 |
| 5,027,109 | 6/1991 | Donovan et al. | 345/165 |
| 5,153,571 | 10/1992 | Takahashi | 345/163 |
| 5,298,918 | 3/1994 | Yen-Chen et al. | 345/163 |
| 5,521,617 | 5/1996 | Imai et al. | 345/167 |

*Primary Examiner*—Richard Hjerpe
*Assistant Examiner*—Amare Mengistu
*Attorney, Agent, or Firm*—Peterson, Wicks, Nemer & Kamrath, P.A.

[57] ABSTRACT

A pulse-type driving device for driving a plurality of light emitting diodes includes a power source providing a DC voltage, a pointer control circuit including a pulse output terminal for outputting pulses therefrom. A plurality of sets of detecting circuits each of which includes one of the light emitting diodes, a phototransistor, and a transistor. The light emitting diode emits light to activate the phototransistor which in turn triggers the transistor to output a signal to the pointer control circuit. A constant current source is connected between the pointer control circuit and the light emitting diodes and provides constant current to energize the light emitting diodes.

4 Claims, 3 Drawing Sheets

PULSE-TYPE DRIVING DEVICE

BACKGROUND OF THE INVENTION

1. Field of the Invention

The present invention relates to a pulse-type driving device, and more particularly to one which is used in driving infrared diodes on a mouse or track ball.

2. Description of the Prior Art

In a pointing input device such as a mouse or a track ball, photoelectric components such as a pair of phototransmitter and photoreceiver are used to detect displacement of the pointing input device in an X coordinate and a Y coordinate. A conventional control circuit as shown in FIG. 5 comprises a pointer control circuit 70 which has four terminals XA, XB, YA, YB respectively connected to one of four detecting circuit 80, 90, 80' and 90' where two detecting circuits 80 and 90 are used for detecting displacement along the X coordinate and two detecting circuits 80' and 90' identical to the detecting circuits 80 and 90 are used for detecting displacement along the Y coordinate. For example, the detecting circuit for the X coordinate comprises two light emitting diodes 81, 91, two phototransistors 82, 92 and two waveform-shaping transistors 83, 93. The light emitting diodes 81, 91 and the phototransistors 82, 92 are positioned at an opposite side to a photogrid wheel (not shown) thus cooperating to detect the displacement in the X coordinate. Similarly, to detect the displacement in the Y coordinate, another photogrid wheel is provided to cooperate with the light emitting diodes 81', 91' and the phototransistors 82', 92'

The collectors of the phototransistors 82, and 92 are connected to a power source VCC. The emitters of the phototransistors 82, and 92 are respectively connected to a base of the transistors 83 and 93. The collectors of the transistors 83 and 93 are respectively connected to the input terminals XA and XB of the pointer control circuit 70.

As described, as the mouse moves along the X coordinate, the corresponding photogrid wheel also rotates, causing the phototransistors 82, 92 together with the transistors 83 and 93 to output a corresponding number of pulses to the input terminals XA, XB of the pointer control circuit 70, thus providing X displacement signal to the pointer control circuit 70. A Y displacement signal to the pointer control circuit 70 is similarly provided.

From the above structure and description, it is known that the precision for detecting the X displacement and the Y displacement depends on the cooperation of the light emitting diodes 81, 91 and the phototransistors 82, 92, i.e., the illuminations of the two light emitting diodes 81, 91 should be identical, and the gains of the phototransistors 82, 92 have to be identical. However, to obtain two phototransistors with identical gain requires cumbersome testing procedure. In addition, the illumination from the light emitting diodes 81, 91 has to be adjusted via a variable resistor 84 connected to the diodes 81 and 91.

Since the efficiencies of the light emitting diodes may be different thus affecting the precision of the detection of the phototransistors. Additionally, the obtaining manner of the power source VCC may affect the operative precision of the phototransistor. For example, a serial-output-type mouse obtains a DC power directly from a signal terminal of a serial interface RS-232C. However the signal levels for different computers are not exactly the same thus causing variation on the source voltage VCC and affecting the detecting precision of the phototransistors. Alternatively, the mouse may obtain power source from a computer connected thereto by using the same power supply of the computer. In this case, the precision problem is raised when the mouse is connected to a notebook computer. It is noted that the notebook computer uses batteries as its power source thus the precision of the mouse is decreased if the total voltage from the batteries reduces after long term use.

It is clear that the mouse suffers from an instability problem due to insufficient voltage from the power supply and also suffers from a precision problem due to parts difference such as the characteristic difference of the phototransistors and the light emitting diodes.

The present invention has arisen to mitigate and/or obviate the afore-described disadvantages of the conventional driving circuit.

SUMMARY OF THE INVENTION

The primary objective of the present invention is to provide a pulse-type driving device which provides constant current to drive infrared diodes on a mouse or track ball thus insuring the mouse or the track ball functions in a stable condition.

In accordance with one aspect of the invention, there is provided a pulse-type driving device for driving a plurality of light emitting diodes including a power source, a pointer control circuit including a pulse output terminal for outputting pulses therefrom. A plurality of sets of detecting circuits each includes one of the light emitting diodes, a phototransistor, and a transistor. The light emitting diode emits light to activate the phototransistor which in turn triggers the transistor to output a signal to the pointer control circuit. A constant current source is connected between the pointer control circuit and the light emitting diodes and provides constant current to energize the light emitting diodes.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
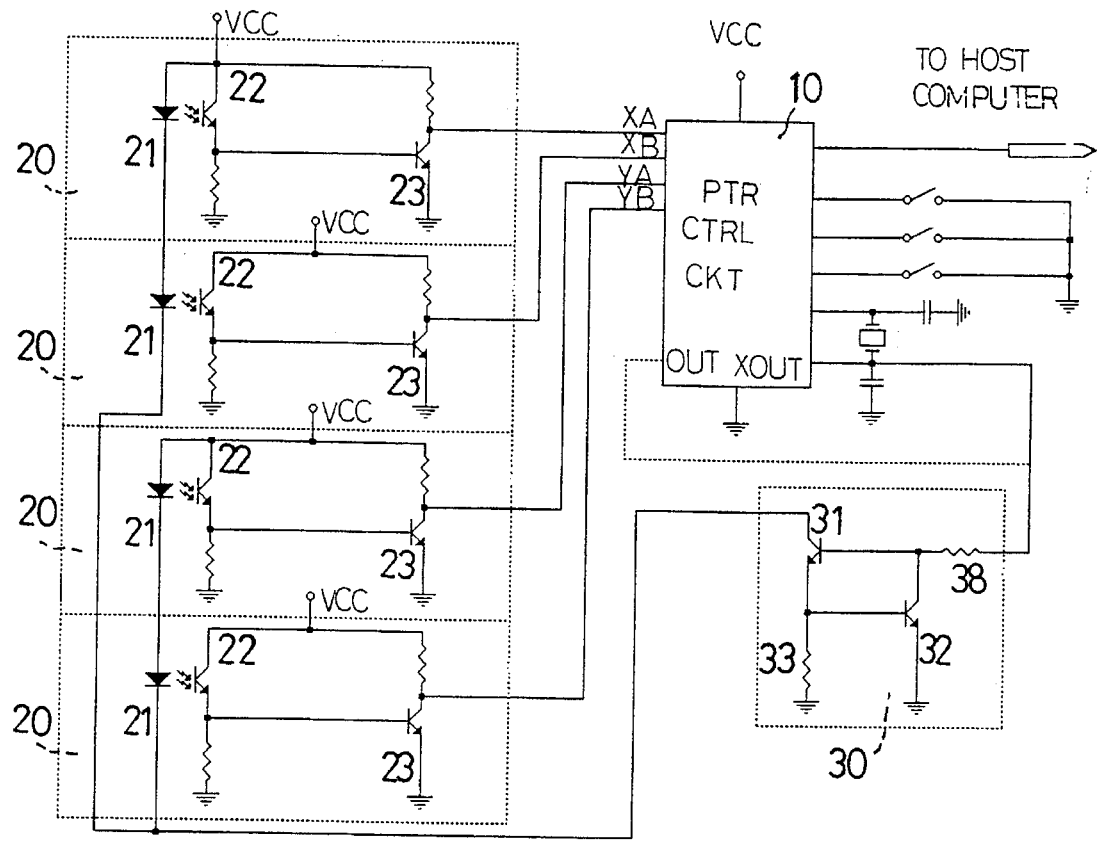
FIG. 1 is a circuit diagram in accordance with the present invention.

Referring to FIG. 1, a pulse-type driving device in accordance with the present invention comprises a pointer control circuit 10, four sets of detecting circuits 20, and a constant current source 30. The four sets of detecting circuit 20 each comprising a light emitting diode 21, a phototransistor 22, and a transistor 23 are conventional and identical to those described previously, thus they are not described in more detail. The pointer control circuit 10 comprises four input terminals XA, XB, YA, YB exactly identical to a conventional one. The pointer control circuit 10 further comprises a pulse output terminal XOUT for outputting pulses in response to the input to the input terminals XA, XB, YA, YB thereof.

The feature of the present invention is in the constant current source 30. The constant current source 30 is coupled to the output terminal XOUT or an output terminal OUT of the pointer control circuit 10. The frequency of the pulses outputted from the output terminal XOUT may be ranged from thousands to millions of hertz. The duty cycle of the pulses may be adjusted according to operation requirement. The constant current source 30 comprises a first transistor 31 and a second transistor 32, with a base of the first transistor 31 connected to a collector of the second transistor 32, and an emitter of the first transistor 31 connected to a base of the second transistor 32. The first transistor 31 has a collector connected to a power source VCC via two diodes 21. The base of the first transistor 31 and the collector of the second transistor 32 are connected to the output terminal XOUT of the pointer control circuit 10 via a resistor 38. Alternatively, the base of the first transistor 31 and the collector of the second transistor 32 may be connected to an output terminal OUT of the pointer control circuit 10 via the resistor 38.

The first transistor 31 is turned on when a positive cycle of the pulse from the output terminal XOUT of the pointer control circuit 10 is applied to the base of the first transistor 31. It is known that the first transistor 31 is an NPN transistor, thus it is turned on when a positive voltage is applied on the base thereof. The diodes 21 are immediately energized to illuminate after the first transistor 31 is turned on. It is known that a loop from the power source VCC through the light emitting diodes 21, the first transistor 31, the resistor 33 and ground is formed to energize the light emitting diodes 21 to illuminate when the transistor 31 is turned on. A forward current $I_F$ of the energized diodes 21 is determined by a voltage drop $V_{BE}$ between the base and emitter of the second transistor 32. It is clearly understood that the forward current $I_F$ through the diodes 21 is substantially equal to a current through the resistor 33. In the present embodiment, the current $I_F$ through the resistor 33 is equal to the base-emitter voltage drop $V_{BE}$ divided by the resistance of the resistor 33, i.e., $I_F=V_{BE}/R_E$, where $R_E$ represents the resistance of the resistor 33. In this configuration, the forward current through the diodes 21 remains in a substantially constant value even when the power source VCC changes. Therefore, it is appreciated that the configuration of the constant current source 30 of the present invention provides a stable operation current to illuminate the diodes 21. Therefore, the illumination from the diodes 21 remains in a substantially constant value.

Figure 2:
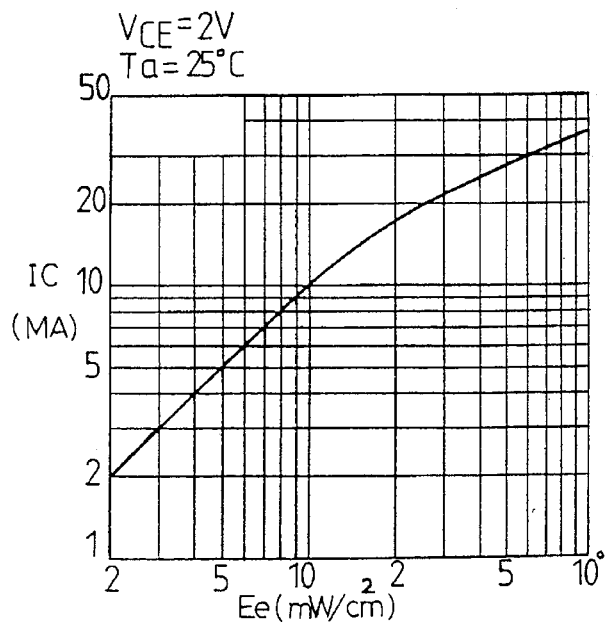
FIG. 2 is a characteristic chart of a phototransistor.

FIG. 2 illustrates a characteristics curve for a phototransistor 22, where a collector current $I_C$ of the phototransistor 22 is substantially proportional to an illumination $E_e$ from the light emitting diodes 21 onto the phototransistor 22. The collector current $I_C$ of the phototransistor 22 can be limited in a required range if the illumination $E_e$ of the light emitting diode 21 is controlled in a specific range. From the above description, it is understood that the constant current source 30 of the present invention enables the light emitting diodes 21 to operate with a stable current, which in turn causes the phototransistor 22 to function with a stable collector current. Therefore, the constant current source 30 can solve the precision problem caused by power supply instability in a notebook computer or the like. It is known that the allowable voltage range is from 3 to 6 volts.

Figure 3:
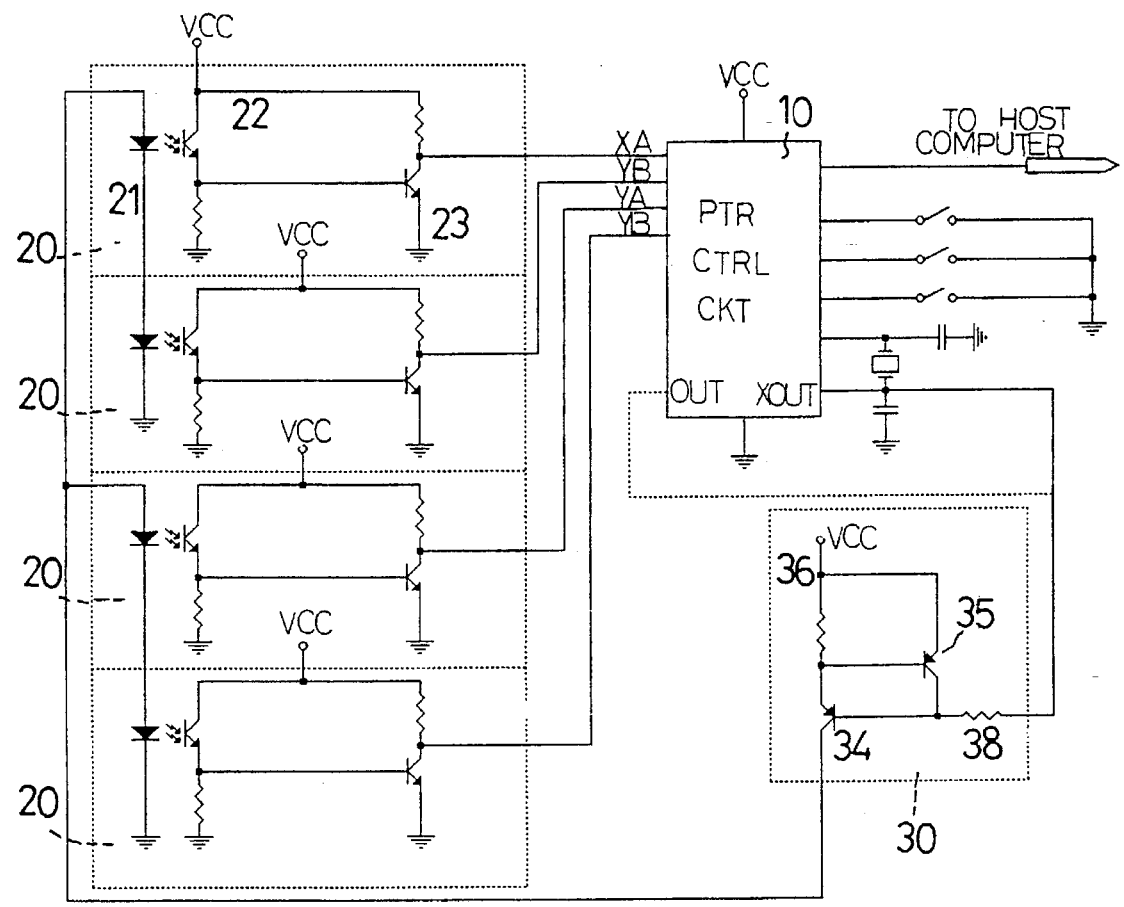
FIG. 3 is an alternative embodiment of the constant current circuit in accordance with the present invention.

In the previous embodiment, the first transistor 31 and the second transistor 32 are NPN type transistors and the first transistor 31 may be activated by applying a positive pulse on the base thereof. An alternative embodiment of the constant current source 30 as shown in FIG. 3 comprises a third transistor 34 and a fourth transistor 35, where the transistors 34 and 35 are PNP type transistors and the third transistor 34 is activated by a logical low half cycle of the pulse from the pointer control circuit 10. The base of the third transistor 34 is connected to the collector of the fourth transistor 35 and the emitter of the third transistor 34 is connected to the base of the fourth transistor 35. A resistor 36 is connected between the emitter of the third transistor 34 and the emitter of the fourth transistor 35. Therefore, a current $I_F$ which passes through the diodes 21 is also determined by the base-emitter voltage $V_{BE}$ of the transistor 35 and the resistance $R_E$ of the resistor 36, where $I_F=V_{BE}/R_E$.

Figure 4:
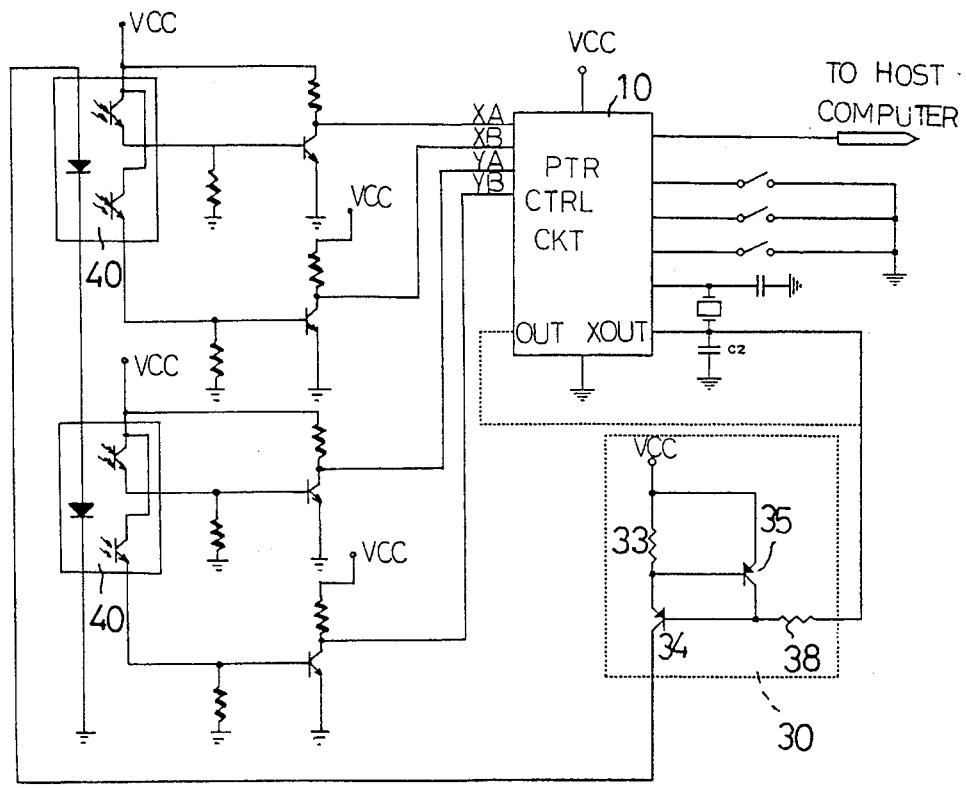
FIG. 4 is an alternative embodiment of the constant current circuit in accordance with the present invention.
Figure 5:
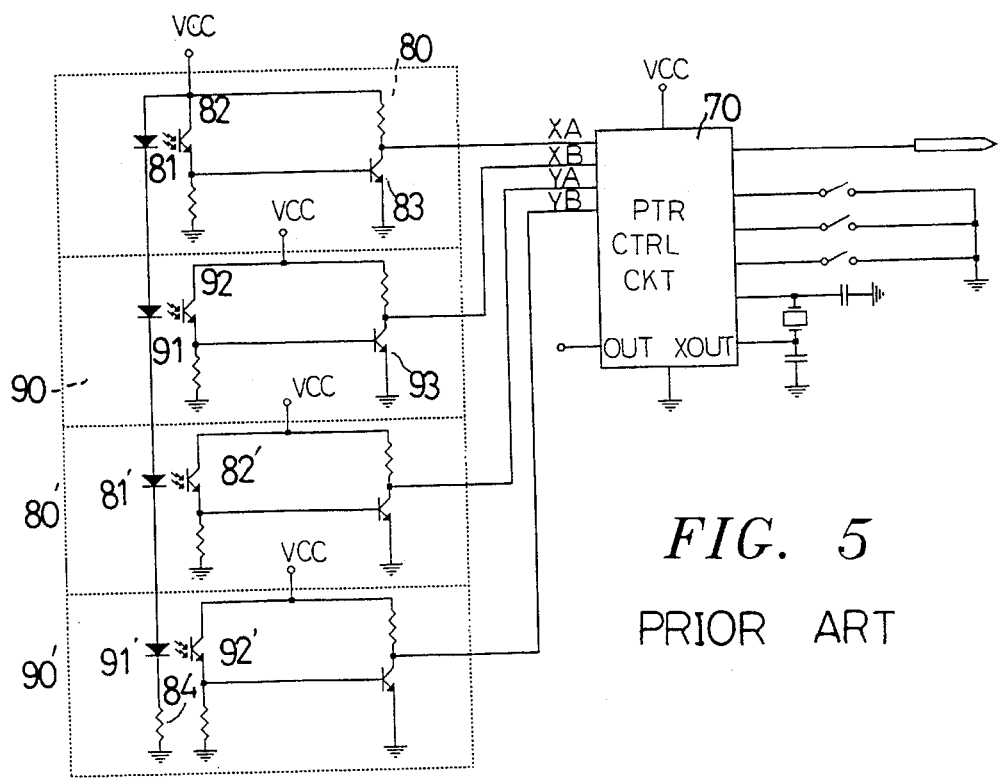
FIG. 5 is a conventional driving circuit.

FIG. 4 illustrates an alternative embodiment of the pulse-type driving device in accordance with the present invention. The constant current source 30 is identical to the one shown in FIG. 3, except that the resistor 36 is replaced with resistor 33. The four detecting circuits 20 are replaced with two detecting circuits 40 each of which comprises a light emitting diode and two phototransistors. In this embodiment, the current $I_F$ through each diode is determined by $V_{BE}$ divided by $R_E$, where $V_{BE}$ is the base-emitter voltage of the transistor 35 and $R_E$ is the resistance of the resistor 33. The detecting circuit 40 is commercially available.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A pulse-type driving device for driving a plurality of light emitting diodes comprising a power source providing a DC voltage;

a pointer control circuit including a pulse output terminal for outputting pulses therefrom;

a plurality of sets of detecting circuits each comprising one of said light emitting diodes, a phototransistor, and a transistor, said light emitting diode emits light to activate said phototransistor which in turns triggers said transistor to output a signal to said pointer control circuit in response;

a constant current source comprising a first transistor, a second transistor and a resistor, a base of the first transistor connected to a collector of the second transistor and the pulse output terminal of the pointer control circuit for receiving pulses therefrom, an emitter of the first transistor connected to a base of the second transistor, a collector of the first transistor connected to the power source via the diodes of the detecting circuits, said resistor connected between an emitter of said first transistor and a ground;

whereby said first transistor and said second transistor are activated when receiving a pulse from said pointer control circuit, in the mean time said light emitting diodes are energized with a constant current determined by a ratio between a base-emitter voltage of said second transistor and a resistance of said resistor.

2. A pulse-type driving device as claimed in claim 1, wherein said first transistor and said second transistor are NPN transistors.

3. A pulse-type driving device for driving a plurality of light emitting diodes comprising a power source providing a DC voltage;

a pointer control circuit including a pulse output terminal for outputting pulses therefrom;

a plurality of sets of detecting circuits each comprising one of said light emitting diodes, a phototransistor, and a transistor, said light emitting diode emitting light to activate said phototransistor which in turns triggers said transistor to output a signal to said pointer control circuit in response;

a constant current source comprising a first transistor, a second transistor and a resistor, a base of the first transistor connected to a collector of the second transistor and the pulse output terminal of the pointer control circuit for receiving pulses therefrom, an emitter of the first transistor connected to a base of the second transistor, an emitter of the first transistor connected to the power source via the resistor, an emitter of the second transistor connected to the power source, a collector of said first transistor connected to the diodes and said diodes are connected to a ground;

whereby said first transistor and said second transistor are activated when receiving a pulse from said pointer control circuit, in the mean time said light emitting diodes are energized with a constant current determined by a ratio between an emitter-base voltage of said second transistor and a resistance of said resistor.

4. A pulse-type driving device as claimed in claim 1, wherein said first transistor and said second transistor are PNP transistors.

* * * * *